United States Patent

Loza et al.

[11] Patent Number: 6,057,390
[45] Date of Patent: May 2, 2000

[54] CROSSLINKABLE POLYMER-MODIFIED ASPHALT AND ITS METHOD OF PREPARATION

[75] Inventors: Roman Loza, Dublin; Laurence G. Dammann, Powell, both of Ohio; Roger E. Hayner, Hebron; Patricia K. Doolin, Ashland, both of Ky.

[73] Assignees: Ashland Inc.; Marathon Ashland Petroleum LLC

[21] Appl. No.: 09/333,330

[22] Filed: Jun. 15, 1999

Related U.S. Application Data

[60] Provisional application No. 60/089,671, Jun. 17, 1998.
[51] Int. Cl.$^7$ ..................................................... C08L 95/00
[52] U.S. Cl. .................. 524/68; 524/59; 524/69; 524/70; 524/71
[58] Field of Search ................................ 524/59, 68, 69, 524/70, 71

[56] References Cited

U.S. PATENT DOCUMENTS 4,145,322  3/1979  Maldonado et al. ................ 524/68
4,332,704  6/1982  Marzocchi et al. ................ 523/214

FOREIGN PATENT DOCUMENTS 1909366  10/1975  U.S.S.R. .

*Primary Examiner*—Peter A. Szekely
*Attorney, Agent, or Firm*—Laurence P. Hobbes; Richard D. Stone

[57] ABSTRACT

A method is provided for improving high temperature performance grade properties of asphalt which comprises i) heating an asphalt cement to 200 to 500° F. (93 to 260° C.), ii) adding 1 to 10 wt. % crosslinkable polymer, e.g., styrene-butadiene-styrene triblock copolymer based on weight of said asphalt cement, iii) adding a useful temperature index (UTI) improving amount of dioxime(s) of 1,4-benzoquinone and its derivatives and optionally, free radical initiator, e.g., organic peroxide, and iv) mixing the resulting blend, thereby providing a paving asphalt having a greater useful temperature index (UTI) than a corresponding blend to which no dioxime is added. The invention further relates to asphalt compositions thus made and paving compositions containing these asphalt compositions.

20 Claims, No Drawings

CROSSLINKABLE POLYMER-MODIFIED ASPHALT AND ITS METHOD OF PREPARATION

This application claims priority from provisional application No. 60/089,671, filed Jun. 17, 1998.

BACKGROUND OF THE INVENTION

I. Field of the Invention

The invention relates to crosslinkable polymer-modified asphalt compositions that exhibit improved performance grade specifications for high temperature properties. The invention further relates to a method of improving polymer efficiency in polymer-modified asphalts.

II. Description of the Prior Art

It is known that adding polymer to asphalt improves the high temperature performance grade (PG) of paving asphalt cements as defined under the test methods established by the Strategic Highway Research Program (SHRP). Commonly used polymers include ethylene vinyl acetate (EVA) copolymers and styrene-butadiene-styrene triblock (SBS) copolymer. These polymers may be blended into the asphalt using high shear mix conditions to ensure proper dispersion of the polymer. Of the polymers used, SB or SBS polymers are preferred because of their compatibility with a large number of asphalts.

Blending crosslinkable polymers with paving asphalts produces a change in the viscoelastic behavior of the asphalt. The change in behavior can be attributed to the formation of a network structure as well as to an increase in viscosity and elasticity. The change in viscoelastic properties is related to the amount of polymer added. Network formation occurs above some finite polymer concentration. Thus, higher temperature PG grades are achieved as the polymer, e.g., SBS, concentration in the asphalt increases. However, the SBS is more costly than the asphalt so for economic reasons its use should be kept to a minimum. The amount of SBS polymer needed can be reduced by adding a vulcanizing (crosslinking) agent such as sulfur. The crosslinking agent allows the network structure to form at lower polymer concentration. This improves polymer efficiency, reducing the amount needed to make a specific grade.

U.S. Pat. No. 4,145,322 to Maldonado et al. teaches that addition of sulfur can improve the efficiency of the SB or SBS, decreasing the amount needed to achieve a desired grade. The sulfur is believed to act as a vulcanizing agent yielding crosslinks between the SB or SBS and asphalt.

Typically, with sulfur crosslinking a 3% SBS/asphalt mixture has about the same SHRP high temperature PG grade as an uncrosslinked 5% SBS/asphalt mixture. However, the use of sulfur has some major drawbacks. In particular, adding sulfur to asphalt produces hydrogen sulfide gas as a byproduct. Hydrogen sulfide is extremely poisonous and must be properly removed and treated. This requires the installation and maintenance of special equipment which increases capital and operating costs.

Accordingly, it would be desirable to provide a method for improving crosslinkable polymer high temperature performance efficiency in asphalt without generating hydrogen sulfide as a byproduct, or by at least significantly reducing the amount of sulfur addition required and/or $H_2S$ produced.

SUMMARY OF THE INVENTION

I. General Statement of the Invention

The present invention relates to a novel method for improving the efficiency of crosslinkable polymers in asphalts. The present invention utilizes a crosslinking system that minimizes or eliminates the need for sulfur or sulfur donating compounds. The present invention utilizes a combination of dioxime(s) of 1,4-Benzoquinone (p-Benzoquinone (PBQDO) or 2,5-Cyclohexadiene-1,4-dione) and its derivatives, and a free radical initiator such as an organic peroxide, e.g., t-butyl peroxybenzoate, TBPB, to crosslink the crosslinkable polymer/asphalt mixture. This has the same effect on desired crosslinkable polymer efficiency as the addition of sulfur, without detrimental effects such as noxious hydrogen sulfide generation. The present invention also encompasses embodiments wherein sulfur is also present as a crosslinking agent, e.g., in amounts of 0.01 wt. % to 1.0 wt. %, preferably 0.05 to 0.5 wt. % sulfur in the asphalt blend.

The present invention can be used to prepare a wide variety of asphalt materials including asphalt pavement compositions, roofing asphalt compositions, coatings, sealants, adhesives, and sound deadeners.

In one aspect, the present invention relates to a method for improving high temperature performance grade properties of asphalt which comprises i) heating an asphalt cement to 200° F. to 500° F. (93° C. to 260° C.), ii) adding 1 wt. % to 10 wt. % crosslinkable polymer based on weight of said asphalt cement, iii) adding a useful temperature index (UTI) improving amount of dioxime(s) of 1,4-benzoquinone and its (1,4-benzoquinone's) derivatives and optionally, free radical initiator, e.g., organic peroxide, and iv) mixing the resulting blend, thereby providing an asphalt having a greater useful temperature index (UTI) than a corresponding blend to which no dioxime of 1,4-benzoquinone and its derivatives is added.

In another aspect, the present invention relates to an asphalt composition comprising a mixture containing a) at least 80 wt. % of an asphalt cement, b) 1 wt. % to 10 wt. % crosslinkable polymer based on weight of said asphalt cement, and c) dioxime(s) of 1,4-benzoquinone and its derivatives and optionally, free radical initiator, in an amount sufficient to improve useful temperature index (UTI) relative to a corresponding mixture free of said dioxime of 1,4-benzoquinone and its derivatives.

In yet another aspect, the present invention relates to a method for improving the effectiveness of crosslinkable polymer modifier in asphalt compositions containing a) at least 80 wt. % asphalt cement and b) 1 wt. % to 10 wt. % crosslinkable polymer by adding a useful temperature index improving amount of dioxime(s) of 1,4-benzoquinone and its derivatives and optionally, free radical initiator.

In still yet another aspect, the present invention relates to a pavement composition comprising an aggregate or aggregate material and from 1.0% to 10.0% of an asphalt composition containing a) at least 80 wt. % of a paving asphalt cement, b) 1 to 10 wt. % crosslinkable polymer, e.g., styrene-butadiene-styrene triblock copolymer, and c) dioxime(s) of 1,4-benzoquinone and its derivatives and optionally, free radical initiator, e.g., organic peroxide, added in an amount sufficient to improve useful temperature index (UTI) relative to a corresponding mixture free of said dioxime of 1,4-benzoquinone.

ASPHALT CEMENT (PETROLEUM BITUMENS)

The asphalt composition of the present invention contains a natural or synthetic asphalt cement component. Such asphalt cement component can have a viscosity of 100 to 5000 poise at 60° C. (140° F.), preferably 250 to 4000 poise, e.g., 2000 poise for AC20 asphalt cement, and 500 poise for AC5 asphalt cement. The asphalt cement component is added in amounts sufficient to provide the resulting asphalt composition with the desired viscosity for the intended application, e.g., 2000 poise at 60° C. (140° F.) for paving applications. For Performance Graded Applications, the asphalt compositions can have a G*/sin delta value in excess of 1.0 kPa at temperatures ranging from 46° C. to 82° C., preferably 52° C. to 76° C. Generally, the asphalt compositions of the present invention contain at least 80 wt. %, preferably from 80 wt. % to 98.9 wt. %, e.g., 90 wt. % to 95 wt. %, of such asphalt cement component. The asphalt cement component can be obtained from any suitable source, e.g., atmospheric distillation bottoms or vacuum tower bottoms. The asphalt used in the present invention can be a natural asphalt or a synthetic asphalt.

Natural asphalt can be obtained from crude petroleum, bituminous schists, heavy oils, bituminous sands or coal. Natural asphalt can be, for example: a) the heaviest fraction obtained by direct distillation of crude petroleum at atmospheric or reduced pressure; b) the heavy phase obtained by solvent-deasphalting a heavy fraction as obtained under a); c) the product of oxidation, in the presence or absence of a catalyst, of a heavy fraction as obtained under a) or of a heavy phase as obtained under b); d) the product of oxidation, in the presence or absence of a catalyst, of a blend of a heavy fraction as obtained under a) or of a heavy phase as obtained under b) and a distillate, or an aromatic extract obtained in the dearomatization of lubricating oils, or a deasphalting pitch; e) a blend of an oxidized product obtained as under c) and d) or of a hard phase, and a distillate, or an aromatic extract obtained in the dearomatization of lubricating oils, or a deasphalting pitch, or a heavy fraction as obtained under a) or a heavy phase as obtained under b); f) a visbroken base, alone or in admixture with one or more of the above said products; g) one of the products as obtained under a) to f) in admixture with a distillate, or an aromatic extract obtained in the dearomatization of lubricating oils, or a deasphalting pitch, or a heavy aromatic fraction (catalytic slurry) obtained from a catalytic cracking process.

Suitable synthetic asphalts have properties similar to those of the above-described natural asphalts, for example, clear synthetic binders that can be colored by addition of pigments. Such asphalts can consist, for example, of petroleum resins or indeno-coumarone resins blended with aromatic and/or paraffinic hydrocarbons. Such petroleum resins can be prepared by polymerization of unsaturated hydrocarbons present in unsaturated petroleum fractions, such as the fractions obtained by thermal or steam cracking or by pyrolysis. The indene-coumarone resins are generally obtained from coal tars.

As used herein, the terms "asphalt composition", "asphalt cement" or "asphalt binder" are understood to refer to any of a variety of organic materials, solid or semi-solid at room temperature, which gradually liquefy when heated, and in which the predominate constituents are naturally occurring bitumens, e.g., Trinidad Lake, or residues commonly obtained in petroleum, synthetic petroleum, or shale oil refining, or from coal tar or the like. A "paving asphalt composition", "paving asphalt cement", or "paving asphalt binder", accordingly is an asphalt composition or asphalt cement having characteristics which dispose the composition to use as a paving material, as contrasted, for example, with an asphalt composition suited for use as a roofing material. "Roofing asphalts", for example, usually have a higher softening point, and are thus more resistant to flow from heat on roofs, the higher softening point generally being imparted by air blowing processes by which they are commonly produced. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface.

CROSSLINKABLE POLYMERS

The present invention adds crosslinkable polymers to the blended asphalt products of the present invention. While the invention is not to be limited to any theory, these polymers apparently cause polymerization with the natural or synthetic asphalts of the invention The added polymers can be vulcanized in situ with the asphalt by the treating with a crosslinking agent in accordance with the present invention, and optionally, accelerators. Suitable crosslinkable polymers include, styrene-butadiene (SB) diblocks, styrene-isoprene-styrene (SIS) triblocks, and styrene-butadiene-styrene (SBS) triblocks, such as those taught in U.S. Pat. No. 3,238,173 to Bailey (assigned Shell); U.S. Pat. No. 4,145,322 to Maldonado et al. (Elf) (block copolymer with an average molecular weight between 30,000 and 300,000 having the theoretical formula $S_x-B_y$, in which S corresponds to styrene structure groups, and B corresponds to conjugated diene structure groups and x and y are integers); U.S. Pat. No. 4,154,710 to Maldonado et al. (Elf) (thermoplastic elastomer having a molecular weight between 100,000 and 2,000,000, e.g. polyisobutenes, styrene-butadiene rubber (SBR), polychloroprene, isobutene-isoprene copolymers, halogenated or non-halogenated, ethylene-propylene-diene terpolymers (EPDM), ethylene-propylene copolymers (EPR), ethylene-cyclopentadiene copolymers, polybutadienes, and polynorbornenes); U.S. Pat. No. 4,162,999 to Bohemen (British Petroleum); U.S. Pat. No. 4,237,052 to Fitoussi et al. (Elf) (dihalopolybutadiene polymer and tri-block copolymer with a linear or cyclic structure of a molecular weight within the range of 100,000 and 300,000); U.S. Pat. No. 4,242,246 to Maldonado (Elf) (polystyrene-polydiene disequenced, multisequenced, or statistical copolymer); U.S. Pat. No. 4,330,449 to Maldonado et al. (Elf) (polyblock copolymer of a styrene-carboxylated conjugated diene having a mean molecular weight of 30,000 to 300,000); U.S. Pat. No. 4,554,313 to Hagenbach (Elf) (styrene-conjugated diene copolymer); U.S. Pat. No. 4,567,222 to Hagenbach (Elf); U.S. Pat. No. 4,585,816 to Vitkuske (Dow Chemical); U.S. Pat. No. 5,023,282 to Neubert (GenCorp); U.S. Pat. No. 5,039,342 to Jelling (National Patent Development); U.S. Pat. No. 5,118,733 to Gelles (Shell); and U.S. Pat. No. 5,120,777 to Chaverot (Elf); (diene/vinyl aromatic block copolymers, e.g. methylstyrene, tertiary butyl styrene, etc.). It is especially preferred to add styrene-butadiene (SB) diblock copolymers or styrene-butadiene-styrene (SBS) triblock copolymers to the blended asphalt products of the present invention. The preferred amount of the polymer introduced into the asphalt ranges from about 1 wt. % to 10 wt. %, preferably 2 wt. % to 5 wt. %, for example, 3 wt. % to 4 wt. % based on asphalt cement content.

CROSSLINKING AGENTS

Dioximes of 1,4-Benzoquinone and its Derivatives

Dioxime(s) of 1,4-benzoquinone (p-benzoquinone or 2,5-cyclohexadiene-1,4-dione) and its derivatives are used alone or in combination with a free radical initiator to crosslink the crosslinkable polymer in the present invention. Such dioximes can be selected from the group consisting of p-benzoquinone dioxime (PBQDO), tetrabromo-1,4-benzoquinone dioxime, tetrachloro-1,4-benzoquinone dioxime, tetrafluoro-1,4-benzoquinone dioxime, duroquinone dioxime (tetramethyl-1,4-benzoquinone dioxime)

and 1,4-naphthaquinone dioxime (CAS No. 105-11-3) available from Aldrich Chemical Company, Milwaukee, Wis. The dioxime can be added to the molten asphalt cement in useful temperature index (UTI)-enhancing amounts which can range from 0.1 to 1.0 parts, preferably from 0.15 to 0.5 parts, e.g., 0.2 parts, based on 100 parts of asphalt. The dioxime component of the invention can be a single dioxime or combinations of two or more of the above dioximes.

Free-Radical Initiators

Free-radical initiators suitable for use as optional additives in the present invention include inorganic peroxides and organic peroxides. Examples of inorganic peroxides or precursors suited to use in the present invention include sodium persulfate, ammonium persulfate, potassium persulfate, lead oxide, and manganese dioxide. Suitable organic peroxides for use in the present invention include diacyl peroxides, e.g., benzoyl peroxide and lauroyl peroxide; ketone peroxides, e.g., methylethylketone peroxide and 2,4-pentanedione peroxide; peroxyesters, e.g., 2,5-dimethyl2,5-di(2-ethylhexanoylperoxy) hexane, t-amylperoxybenzoate, and t-butylperoxybenzoate; dialkyl peroxides, e.g., dicumyl peroxide and 2,5-dimethyl-2,5-di(t-butylperoxy) hexane; hydroperoxides, e.g., cumene hydroperoxide and t-butyl hydroperoxide; and peroxyketals, e.g., 1,1-di(t-butylperoxy)cyclohexane and ethyl 3,3-di(t-amylperoxy)-butyrate, all of which are available from Elf Atochem North America, Inc., Philadelphia, Pa.

Organic peroxides are preferred for use as free radical initiators with t-butylperoxybenzoate, particularly preferred.

When used in combination with the dioxime crosslinking agent, the free radical initiator is added in amounts ranging from 0.01 to 1 part, preferably 0.05 to 0.5 part, based on 100 parts of asphalt.

DESCRIPTION OF THE PREFERRED EMBODIMENTS

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications will now be graded as PG or Performance Graded binders. As such, their designation will be representative of their resistance at both high and low temperature, indicating their useful temperature range as a PG AA–BB where AA=high temperature resistance in degrees Celsius and BB is low temperature cracking resistance in minus degrees Celsius, i.e., PG 64-22 would prevent rutting up to 64° C. (147° F.) and low temperature cracking to a minus 22° C. (−7.6° F.). Useful temperature index (UTI) is the difference between AA and BB such that a PG 64-22 material would have a UTI of 64-(−22), i.e., 86.

Areas of high loading or slow or standing traffic as well as areas where temperature extremes can be experienced will require binders having a UTI in excess of 86° C. (155° F.) between high and low temperature levels will require the use of modifiers to obtain the increased useful temperature range. As a result, it has been common to add or start with softer asphalts to reach low temperature properties while adding modifiers such as polymers to achieve high temperature rutting resistance. The present invention provides a method for providing improved paving asphalt compositions by providing asphalts of increased useful temperature index (UTI) as a result of improving polymer efficiency.

In the process of the invention, the natural or synthetic asphalt cements employed are heated to a temperature in the range of 200° F. to 500° F. (93° C. to 260° C.), preferably 300° F. to 400° F. (149° C. to 204° C.). The crosslinkable polymer, e.g., SBS copolymer, added in amounts ranging from 1 to 10 wt. % of the asphalt cement (petroleum bitumen) component is dispersed in the asphalt using a high or low shear mixer. Mixing time is adjusted to ensure complete dispersion of the crosslinkable polymer. Other polymers may be added including EVA, ethylene homo- and co- polymers and the like. The oxime, e.g., PBQDO, (0.1 to 1.0 parts based on 100 parts of asphalt) and free radical initiator, e.g., TBPB, (0.1 to 1.0 parts based on 100 parts of asphalt) are preferably added sequentially. Mixing may be continued for 30 to 60 minutes. The asphalt may be kept at 300° F. to 400° F. (149° C. to 204° C.) for an additional 4 to 240 hours with or without stirring. Finally, the polymer modified asphalt is graded using the test procedures outlined in SHRP and adopted by American Association of State Highway and Transportation Officials, AASHTO, in their MP-1 Standard Test Method, "Superpave/Performance Graded Asphalt Binder Specification and Testing reference manual," Superpave Series No. 1 (SP-1), available from Asphalt Institute, Lexington, Ky. (1997). The specifications are also set out in U.S. Pat. No. 5,601,697 to Miller.

COMPARATIVE EXAMPLE 1

A sample of AC-20 was SHRP graded. The sample had an actual SHRP grade of 65.8-25.8 (UTI=91.6) and was rated as a PG64-22.

EXAMPLE 1

A mixture of the AC-20 of Comparative Example 1 and 3% of an SBS triblock copolymer in white crumb form having linear molecular structure containing 30% by weight styrene and 70% by weight butadiene, with specific gravity of 0.94 g/cc, inherent viscosity (0.5 wt. % SBS in toluene @ 30° C.) of 0.91 cc/g and Brookfield viscosity (25 wt. % SBS in toluene @ 23° C.) of 4,150 cps, available from Elastomers America, Houston, Tex., was mixed at 325° F. (163° C.), for 30 minutes using a Ross high speed mixer available from Charles Ross & Son Co., Hauppage, N.Y., operating at 3000 rpm. Next 0.20 parts per hundred parts asphalt (pha) of PBQDO and 0.30 pha of t-butyl peroxybenzoate were added and the mixture stirred for 30 minutes. The mixture was placed in an oven set at 330° F. (166° C.) for 24 hours without stirring. This sample had an actual SHRP grade of 75.8-25.9 (UTI=101.7) and was rated as a PG70-22.

COMPARATIVE EXAMPLE 2

A sample of AC-20 was SHRP graded. The sample had an actual SHRP grade of 64.5-23.5 (UTI=88.0) and was rated as a PG64-22.

COMPARATIVE EXAMPLE 2A

A sample of the AC-20 of Comparative Example 2 was modified with 5 wt. % of the SBS polymer of Example 1. The sample had an actual SHRP grade of 77.8-27.5 (UTI=105.3) and was rated as a PG76-22.

COMPARATIVE EXAMPLE 2B

A sample of the AC-20 of Comparative Example 2 was modified with 3 wt. % of the SBS polymer of Example 1.

The sample had an actual SHRP grade of 72.1-27.7 (UTI=99.8) and was rated as a PG70-22.

COMPARATIVE EXAMPLE 2C

A mixture of the AC-20 of Comparative Example 2 and 3 wt. % of the SBS polymer of Example 1 was mixed at 335° F. (168° C.) for 30 minutes using a Ross high speed mixer operating at 3000 rpm. Next, 0.10 parts per hundred parts of asphalt (pha) of Rubbermakers sulfur available from Flexsys of Akron, Ohio were added and the mixture stirred for 30 minutes at 1000 rpm. The mixture was placed in an oven set at 335° F. (168° C.) for 24 hours without stirring. The sample smelled of hydrogen sulfide and had an actual SHRP grade of 75.2-27.7 (UTI=102.9) and was rated as a PG70-22.

EXAMPLE 2

A mixture of the AC-20 of Comparative Example 2 and 3 wt. % of the SBS polymer of Example 1 was mixed at 330° F. (166° C.) for 30 minutes using a Ross high speed mixer operating at 3000 rpm. Next, 0.18 parts per hundred parts asphalt (pha) of PBQDO and 0.30 pha of t-butyl peroxybenzoate were added and the mixture stirred for 30 minutes. The mixture was placed in an oven set at 330° F. (166° C.) for 24 hours without stirring. This sample had an actual SHRP grade of 76.9-26.1 (UTI=103.0) and was rated as a PG76-22.

EXAMPLE 3

A mixture of the AC-20 of Comparative Example 1A and 3 wt. % of the SBS polymer of Example 1 was mixed at 330° F. (166° C.) for 30 minutes using a Ross high speed mixer operating at 3000 rpm. Next, 0.18 parts per hundred parts asphalt (pha) of PBQDO and 0.30 pha of t-butyl peroxybenzoate were added and the mixture stirred for 30 minutes. The mixture was placed in an oven set at 330° F. (166° C.) for 24 hours without stirring. This sample had an actual SHRP grade of 75.9-28.2 (UTI=104.1) and was rated as a PG70-28.

Comparing Examples 1, 2 and 3 with Comparative Examples 1 and 2 shows that the process of this invention significantly improves the UTI of the modified asphalt cements and raises the high temperature performance grade by one or two PG grades. Furthermore, comparison of Example 2 and Comparative Example 2C shows that the process of the present invention is as efficient as sulfur crosslinking but without the detrimental effects of hydrogen sulfide generation. Asphalt paving compositions of the present invention exhibit a distinct improvement in useful temperature index (UTI) as defined by the Superpave Performance Graded (PG) Asphalt Binder Specifications, AASHTO MP1.

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. A method for improving high temperature performance grade properties of asphalt which comprises i) heating an asphalt cement to 200 to 500° F. (93 to 260° C.), ii) adding 1 wt. % to 10 wt. % crosslinkable polymer based on weight of said asphalt cement, selected from the group consisting of styrene-butadiene diblock copolymer (SB), styrene-isoprene-styrene triblock copolymer (SIS), and styrene-butadiene-styrene triblock copolymer (SBS), iii) adding a useful temperature index (UTI) improving amount of dioxime(s) of 1,4-benzoquinone and optionally, free radical initiator, and iv) mixing the resulting blend, thereby providing an asphalt having a greater useful temperature index (UTI) than a corresponding blend to which no dioxime of 1,4-benzoquinone is added.

2. The method of claim 1 wherein said asphalt cement comprises at least 80 wt. % of said asphalt and is selected from the group consisting of natural asphalts and synthetic asphalts, said crosslinkable polymer is added in amounts ranging from 2 wt. % to 5 wt. %, said dioxime is selected from the group consisting of 1,4-benzoquinone dioxime, tetrabromo-1,4-benzoquinone dioxime, tetrafluoro-1,4-benzoquinone dioxime, duroquinone dioxime, anthraquinone dioxime and naphthaquinone dioxime, added in amounts ranging from 0.01 to 1.0 parts based on 100 parts of asphalt, and said free radical initiator comprises organic peroxide selected from the group consisting of diacyl peroxides, ketone peroxides, peroxydicarbonates, peroxyesters, dialkyl peroxides, hydroperoxides, and peroxyketals and is optionally added in amounts ranging from 0.01 to 1.0 parts based on 100 parts of asphalt.

3. The method of claim 1 wherein said asphalt cement comprises 80 wt. % to 98.9 wt. % of said asphalt and is selected from the group consisting of natural asphalts and synthetic asphalts, said crosslinkable polymer is selected from the group consisting of styrene-butadiene diblock copolymer (SB), styrene-isoprene-styrene triblock copolymer (SIS), and styrene-butadiene-styrene triblock copolymer (SBS), said dioxime is 1,4-benzoquinone dioxime added in amounts ranging from 0.05 to 0.5 parts based on 100 parts of asphalt, and said free radical initiator is selected from the group consisting of benzoyl peroxide, lauroyl peroxide, methylethylketone peroxide, 2,4-pentanedione peroxide, di(2-ethylhexyl) peroxydicarbonate, 2,5-dimethyl-2,5-di(2-ethylhexanoylperoxy) hexane, t-amyl peroxybenzoate, t-butyl peroxybenzoate, dicumyl peroxide, 2,5-dimethyl-2,5-di(t-butylperoxy) hexane, cumene hydroperoxide, t-butyl hydroperoxide, 1,1-di(t-butylperoxy) cyclohexane, and ethyl 3,3-di(t-amylperoxy)-butyrate, optionally added in amounts ranging from 0.15 to 0.5 parts based on 100 parts of asphalt.

4. The method of claim 1 wherein said crosslinkable polymer is styrene-butadiene-styrene triblock copolymer (SBS), said dioxime is 1,4-benzoquinone dioxime, and said free radical initiator is t-butyl peroxybenzoate.

5. The method of claim 1 wherein said asphalt cement is heated to 300° F. to 400° F. (149° C. to 204° C.), and said polymer is added under conditions sufficient to disperse said polymer.

6. The method of claim 5 further comprising v) maintaining the mixed blend of iv) at 300° F. to 400° F. (149° C. to 204° C.) for 4 to 240 hours.

7. The method of claim 1 wherein said resulting blend further comprises 0.01 wt. % to 1.0 wt. % sulfur.

8. An asphalt composition comprising a mixture containing a) at least 80 wt. % of an asphalt cement selected from the group consisting of natural asphalts and synthetic asphalts, b) 1 wt. % to 10 wt. % crosslinkable polymer based on weight of said asphalt cement, selected from the group consisting of styrene-butadiene diblock copolymer (SB), styrene-isoprene-styrene triblock copolymer (SIS), and styrene-butadiene-styrene triblock copolymer (SBS), and c) dioxmime(s) of 1,4-benzoquinone and optionally, free radical initiator, present in an amount sufficient to improve useful temperature index (UTI) relative to a corresponding mixture free of said dioxime.

9. The asphalt composition of claim 8 wherein said mixture contains 80 wt. % to 98.9 wt. % of said asphalt cement, 2 wt. % to 5 wt. % of said crosslinkable polymer, 0.01 to 1.0 parts based on 100 parts of asphalt of said dioxime which is selected from the group consisting of 1,4-benzoquinone dioxime, tetrabromo-1,4-benzoquinone dioxime, tetrafluoro-1,4-benzoquinone dioxime, duroquinone dioxime, anthraquinone dioxime and naphthaquinone dioxime, and 0.01 to 1.0 parts based on 100 parts of asphalt of said free radical initiator which comprises organic peroxide selected from the group consisting of diacyl peroxides, ketone peroxides, peroxydicarbonates, peroxyesters, dialkyl peroxides, hydroperoxides, and peroxyketals.

10. The composition of claim 8 wherein said mixture contains 90 wt. % to 95 wt. % of said asphalt cement, 2 wt. % to 5 wt. % of said crosslinkable polymer which is styrene-butadiene-styrene triblock copolymer (SBS), 0.1 to 1.0 parts based on 100 parts of asphalt of said dioxime which is 1,4-benzoquinone dioxime, and 0.1 to 1.0 parts based on 100 parts of asphalt of said free radical initiator which comprises a peroxyester.

11. The composition of claim 8 wherein said mixture contains 0.2 to 0.3 parts t-butyl peroxybenzoate as said free radical initiator.

12. The composition of claim 8 wherein said mixture contains 0.01 wt. % to 1.0 wt. % sulfur.

13. The composition of claim 8 wherein said asphalt composition is a paving asphalt composition.

14. The composition of claim 8 wherein said asphalt composition is selected from the group consisting of roofing asphalt composition, coatings, sealants, adhesives, and sound deadeners.

15. A method for improving the effectiveness of crosslinkable polymer modifier in asphalt compositions containing a) at least 80 wt. % asphalt cement and b) 1 wt. % to 10 wt. % crosslinkable polymer selected from the group consisting of styrene-butadiene diblock copolymer (SB), styrene-isoprene-styrene triblock copolymer (SIS), and styrene-butadiene-styrene triblock copolymer (SBS), which method comprises adding a useful temperature index improving amount of dioxime(s) of 1,4-benzoquinone and optionally, free radical initiator.

16. The method of claim 15 wherein said asphalt cement comprises at least 80 wt. % of said asphalt and is selected from the group consisting of natural asphalts and synthetic asphalts, said crosslinkable polymer is added in amounts ranging from 2 wt. % to 5 wt. %, said dioxime is selected from the group consisting of 1,4-benzoquinone dioxime, tetrabromo-1,4-benzoquinone dioxime, tetrafluoro-1,4-benzoquinone dioxime, duroquinone dioxime, anthraquinone dioxime and naphthaquinone dioxime, added in amounts ranging from 0.01 to 1.0 parts based on 100 parts of asphalt, and said free radical initiator comprises organic peroxide selected from the group consisting of diacyl peroxides, ketone peroxides, peroxydicarbonates, peroxyesters, dialkyl peroxides, hydroperoxides, and peroxyketals and is optionally added in amounts ranging from 0.01 to 1.0 parts based on 100 parts of asphalt.

17. The method of claim 15 wherein said dioxime is 1,4-benzoquinone dioxime added in amounts ranging from 0.05 to 0.5 parts based on 100 parts of asphalt, and said free radical initiator comprises t-butyl peroxybenzoate, optionally added in amounts ranging from 0.15 to 0.5 parts based on 100 parts of asphalt.

18. A pavement composition comprising an aggregate or aggregate material and from 1.0 wt. % to 10.0 wt. % of an asphalt composition containing a) at least 80 wt. % of a paving asphalt cement, b) 1 wt. % to 10 wt. % crosslinkable polymer selected from the group consisting of styrene-butadiene diblock copolymer (SB), styrene-isoprene-styrene triblock copolymer (SIS), and styrene-butadiene-styrene triblock copolymer (SBS), and c) dioxime(s) of 1,4-benzoquinine and optionally, organic peroxide, added in an amount sufficient to improve useful temperature index (UTI) relative to a corresponding mixture free of said dioxime of 1,4-benzoquinone.

19. The pavement composition of claim 18 wherein said asphalt composition contains 80 wt. % to 98.9 wt. % of said asphalt cement, 2 wt. % to 5 wt. % of said crosslinkable polymer, 0.01 to 1.0 parts based on 100 parts of asphalt of said dioxime which is selected from the group consisting of 1,4-benzoquinone dioxime, tetrabromo-1,4-benzoquinone dioxime, tetrafluoro-1,4-benzoquinone dioxime, duroquinone dioxime, anthraquinone dioxime and naphthaquinone dioxime, and 0.01 to 1.0 parts based on 100 parts of asphalt of said free peroxides, ketone peroxides, peroxydicarbonates, peroxyesters, dialkyl peroxides, hydroperoxides, and peroxyketals.

20. The pavement composition of claim 18 wherein said asphalt composition contains 90 wt. % to 95 wt. % of said asphalt cement, 2 wt. % to 5 wt. % of said crosslinkable polymer which is styrene-butadiene-styrene triblock copolymer (SBS), 0.1 to 1.0 parts based on 100 parts of asphalt of said dioxime which is 1,4-benzoquinone dioxime, and 0.1 to 1.0 parts based on 100 parts of asphalt of said free radical initiator which comprises t-butyl peroxybenzoate.

* * * * *